United States Patent
Knoeller et al.

(10) Patent No.: US 10,843,526 B2
(45) Date of Patent: Nov. 24, 2020

(54) MOTOR VEHICLE AIR-CONDITIONING SYSTEM

(71) Applicant: Mahle International GmbH, Stuttgart (DE)

(72) Inventors: Rainer Knoeller, Jettingen (DE); Markus Michael, Ilsfeld (DE); Anja Reiter, Schorndorf (DE); Walter Wolf, Oppenweiler-Zell (DE)

(73) Assignee: Mahle International GmbH (DE)

( * ) Notice: Subject to any disclaimer, the term of this patent is extended or adjusted under 35 U.S.C. 154(b) by 20 days.

(21) Appl. No.: 16/120,438

(22) Filed: Sep. 3, 2018

(65) Prior Publication Data

US 2019/0070923 A1 Mar. 7, 2019

(51) Int. Cl.
| | |
|---|---|
| *B60H 1/00* | (2006.01) |
| *B60H 3/06* | (2006.01) |
| *F24F 3/16* | (2006.01) |
| *G01N 21/17* | (2006.01) |

(52) U.S. Cl.
CPC ......... *B60H 1/008* (2013.01); *B60H 1/00271* (2013.01); *B60H 1/00792* (2013.01); *B60H 3/0608* (2013.01); *B60H 2001/003* (2013.01); *B60H 2003/0683* (2013.01); *F24F 3/1607* (2013.01); *G01N 21/1702* (2013.01)

(58) Field of Classification Search
CPC ..... B60H 1/008; B60H 1/0271; F24F 3/1607; G01N 21/1702; G01N 21/1704; G01N 15/0205; G01N 15/06
USPC ........................................................ 356/438
See application file for complete search history.

(56) References Cited

U.S. PATENT DOCUMENTS

| | | | |
|---|---|---|---|
| 5,706,170 A | 1/1998 | Glovatsky et al. | |
| 6,091,494 A * | 7/2000 | Kreikebaum | ...... G01N 15/0205 356/336 |
| 6,206,775 B1 * | 3/2001 | Lemaitre | ................ B60H 1/008 139/158 |
| 6,307,187 B1 | 10/2001 | Peter et al. | |

(Continued)

FOREIGN PATENT DOCUMENTS

| | | |
|---|---|---|
| DE | 196 50 038 A1 | 6/1998 |
| DE | 10 2007 014 519 A1 | 10/2008 |

(Continued)

*Primary Examiner* — Paul Alvare
(74) *Attorney, Agent, or Firm* — Fishman Stewart PLLC

(57) ABSTRACT

An air-conditioning system of a motor vehicle may include a channel system configured to allow air to flow therethrough during operation and at least one heat exchanger positioned within the main channel and configured to air-condition air supplied to a motor vehicle interior of the motor vehicle. The channel system may include a main channel. The system may include a sensor device configured to measure an air characteristic of air to be analysed. The sensor device may include an analysis channel which the air to be analysed can flow through, a generation device configured to generate electromagnetic waves penetrating the analysis channel, a sensor temperature-control space separated from the analysis channel, and a temperature-control channel configured to apply air-conditioned air to the generation device to control a temperature of the generation device. The generation device is at least partially arranged in the sensor temperature-control space.

20 Claims, 2 Drawing Sheets

(56) References Cited

U.S. PATENT DOCUMENTS

| | | | | |
|---|---|---|---|---|
| 6,687,271 | B2* | 2/2004 | Um | H01S 3/0627 |
| | | | | 372/36 |
| 6,758,739 | B1 | 7/2004 | Sangwan et al. | |
| 7,440,100 | B2* | 10/2008 | Siemens | G01N 21/53 |
| | | | | 356/338 |
| 7,551,277 | B2* | 6/2009 | Cole | G01F 1/6842 |
| | | | | 356/335 |
| 8,115,931 | B2 | 2/2012 | Miklos et al. | |
| 8,479,559 | B2* | 7/2013 | Miklos | G01N 21/031 |
| | | | | 250/339.07 |
| 2008/0246965 | A1* | 10/2008 | Miller | G01N 15/0205 |
| | | | | 356/337 |
| 2010/0073173 | A1* | 3/2010 | Zindy | G01N 15/06 |
| | | | | 340/627 |
| 2010/0103425 | A1* | 4/2010 | Miklos | G01N 21/1702 |
| | | | | 356/438 |
| 2010/0144261 | A1* | 6/2010 | Barkic | B60H 1/00457 |
| | | | | 454/75 |
| 2011/0314902 | A1* | 12/2011 | Dantler | G01N 1/14 |
| | | | | 73/28.01 |
| 2012/0015594 | A1* | 1/2012 | Yenneti | B60H 1/00742 |
| | | | | 454/75 |
| 2015/0268159 | A1* | 9/2015 | Tabaru | G01N 21/39 |
| | | | | 356/437 |
| 2017/0276592 | A1* | 9/2017 | Kwon | G01N 15/1425 |
| 2018/0188169 | A1* | 7/2018 | Cai | G01N 15/06 |
| 2018/0252631 | A1* | 9/2018 | Lee | G01N 15/06 |
| 2019/0023099 | A1* | 1/2019 | Li | B60H 1/248 |
| 2019/0039739 | A1* | 2/2019 | Winter | B64D 13/06 |
| 2019/0285753 | A1* | 9/2019 | Spruit | G01N 15/06 |

FOREIGN PATENT DOCUMENTS

| | | |
|---|---|---|
| DE | 102007108571 A1 | 10/2008 |
| EP | 2 407 326 A1 | 1/2012 |

* cited by examiner

MOTOR VEHICLE AIR-CONDITIONING SYSTEM

CROSS-REFERENCE TO RELATED APPLICATION

This application claims priority to German Application No. DE 10 2017 215 465.9 filed on Sep. 4, 2017, the contents of which are hereby incorporated by reference in its entirety.

TECHNICAL FIELD

The present invention relates to an air-conditioning system of a motor vehicle for air-condition an interior of the vehicle in accordance with the preamble of claim 1. The invention furthermore relates such a motor vehicle.

BACKGROUND

Air-conditioning systems serve to ventilate and to air-condition the interiors of a motor vehicle, in particular, for passengers of the motor vehicle. By means of the air-conditioning system, air-conditioned air can be thereby supplied to the interior. Usually, heat exchangers are used that are integral part of the air-conditioning system in order to air-condition the air.

Thereby, it is desirable to design the operation of the air-conditioning system depending on various parameters. For this purpose, sensor devices are usually used which determine characteristics of the air to be analysed, wherein the control of the air-conditioning system occurs thereby being dependent on these determined characteristics.

From DE 196 50 038 A1, a resistance heating element is known to heat the air to be supplied to the interior, wherein the actual temperature of the resistance heating element is determined based on a resistance of the resistance heating element. Thereby, it is possible to set the temperature of the air being supplied to the interior.

In DE 10 2007 018 571 A1, an air-conditioning system of a motor vehicle is show, which comprises a fan to convey air for the purpose of supply it to the interior space of a motor vehicle. The air-conditioning system furthermore has an air quality sensor to measure the air quality of the air, which forms a constructional unit along with the fan.

SUMMARY

The present invention deals with the task to indicate improved or at least alternative embodiments for an air-conditioning system of the aforementioned type as well as for a vehicle with such an air-conditioning system, which are particularly characterized by an increased precision of the measured characteristics of the air to be analysed and/or an increased service life of a related sensor device.

According to the invention, the task is achieved by means of the features of the independent claims. Favourable embodiments are the object of the dependent claims.

The present invention is based on the general idea to use a sensor device within an air-conditioning system that uses electromagnetic waves to measure a characteristic of air to be analysed and to arrange a generation device at least partially within a separate space to generate the electromagnetic waves and to apply air-conditioned air to it for the purpose of temperature control. The use of the sensor device working by means of electromagnetic waves results in an increased level of precision of the measured characteristic of the air to be analysed. The temperature control of the generation device within the space additionally allows that the generation device can be operated within a desired temperature window so that the detection precision of the sensor device is further improved. Furthermore, the temperature control of the generation device, in particular, results in such a way that the generation device is operated within a desired temperature window results in reduced damage and/or two a reduced aging process of the generation device and consequently, to an increased service life of the same or of the air-conditioning system. According to the inventive idea, the air-conditioning system serves to air-condition an interior of the motor vehicle and a motor vehicle interior, in particular, for passengers of the motor vehicle, wherein, for this purpose, at least one heat exchanger for air-conditioning the air being supplied to the motor vehicle interior of the motor vehicle is provided, which is arranged within a main channel of the channel system of the air-conditioning system air flows through. The air-conditioning system additionally comprises the sensor device, which serves to measure at least one characteristic of the air to be analysed. According to the invention, the sensor device comprises an analysis channel, which air to be analysed can flow through, which is penetrated by the electromagnetic waves generated by the generation device during operation so that at least one characteristic of the air to be analysed can be measured. That means that the sensor device comprises the generation device to generate the electromagnetic waves penetrating the analysis channel to measure the characteristic of the air to be analysed. The sensor device furthermore comprises the space, hereinafter also referred to in the following as the sensor temperature-control space, in which the generation device is at least partially arranged, wherein the space is separated from the analysis channel, and particularly, fluidically separated. The air-conditioning system additionally comprises a sensor temperature-control channel or, in short temperature-control channel to apply air-conditioned air to the generation device for the purpose of controlling the temperature of the generation device.

The at least one heat exchanger is used to control the temperature of the air and/or to change the humidity within the air. At least one such heat exchanger can be an evaporator to cool the air and/or a heat exchanger to heat the air, in particular a water/air heat exchanger, a heat pump/heat exchanger or an electric heat exchanger. Heat exchanger that are designed as heat radiators are also conceivable.

The temperature-control channel and the analysis channel are separate channels or at least separated and sections. Applying air-conditioned air to the generation device serves to control the temperature of the generation device as mentioned in the above. For this purpose, the temperature-control channel supplies the air-conditioned air to the space. Thereby, a direct flow or application of the generation device is not obligatorily necessary. The supply of air-conditioned air to the space by means of the temperature-control channel for the purpose of controlling the temperature of the generation device occurs in such a way that heat exchange between the air-conditioned air and the generation device takes place.

Embodiments are preferable where the air-conditioning system comprises a filter device, which serves to filter the air being supplied to the motor vehicle interior. This filter device, hereinafter also referred to as the system filter device, is preferably also used to filter the air being applied to the generation device. By means of this a corresponding burdening of the generation device by air contamination is reduced. As a result, wear of the generation device is reduced in the service life of the generation device is further improved. Additionally, the electromagnetic waves generated using the generation device can be generated with improved quality and/or with more precise specified parameters. The system filter device is favourably arranged within the main channel, in particular upstream to the at least one heat exchanger. The temperature channel favourably branches off from the main channel downstream from the system filter device. In addition, it is conceivable to use such a heat exchanger to filter the air being applied to the generation device. For this purpose, it is favourable if the temperature-control channel branches off from the main channel downstream from the at least one corresponding heat exchanger.

It is also conceivable to use a filter device, which is separate from the system filter device, hereinafter also referred to as a sensor temperature-control filter device in the following, to filter the air applied to the generation device. The sensor temperature-control filter device is preferably arranged upstream to the generation device and the sensor temperature-control space. In particular, the filter device serves the purpose of removing dirtiness and/or particles, in particular fine dust from the air applied to the generation device.

The sensor temperature-control filter device can principally be arranged and/or provided in any way, provided that it results in filtering the air being applied to the generation device. It is conceivable to arrange the sensor-temperature-control filter device within the temperature-control channel.

The characteristics of the air measured by the sensor device [[is]] preferably reflect the quality of the air or correlate with the quality. Thereby, in particular, this can have to do with the number and/or density of particles within the air. In particular, the characteristic analysed with the aid of the sensor device can be the fine-particle density within the air. Thereby, air with a low level of fine-particle density comprises a high level of quality than the air with a higher fine-particle density. The at least one characteristic can also be the concentration of nitrogen oxides and/or carbon oxides and/or oxygen and the like in the air.

The sensor device can also principally comprise two or a plurality of such analysis channels, which air, in particular, from various sources, for example, from the motor vehicle interior, from the ambient environment of the motor vehicle or from the main channel of the air-conditioning system flows through respectively or can flow through during operation.

It is conceivable to provide at least one such analysis channel with an interaction section, in which the measurement of at least one characteristic of the air occurs. In the interaction section, the electromagnetic waves pass through the analysis channel and interact with the air to be analysed flowing through the analysis channel. Thereby, this interaction is used to record the characteristic of the air.

The generation device can principally generate electromagnetic waves of any kind, meaning in particular, any wavelength and/or period. In particular, the generation device can generate and emit pulsed electromagnetic waves. In addition, the generation device can also generate and emit monochromatic electromagnetic waves.

The sensor device furthermore comprises at least one detector, which detects the electromagnetic waves after passing through and crossing the analysis channel, in particular, penetrating it, and more preferably passing through and crossing the interaction section and interacting with the air in order to determine the at least one characteristic of the air.

Preferred embodiments provide for a generation device, which generates electromagnetic waves within the optical range. The generation device is preferably designed as an optical generation device. The generation device thereby preferably comprises a laser or is designed as such a laser. By means of this, the generation device can be implemented in a simplified manner and/or be integrated into the air-conditioning system. The wavelength of the electromagnetic waves and the light is, for example, within the range of the magnitude of the particles measured in the air, in particularly the smallest ones and is, in particular between 10 and 10,000 nanometres.

The air to be analysed by the sensor device, meaning the air flowing through the analysis channel, can originate from any source. Preferably, the air to be analysed, the characteristic of which is measured, is relevant to controlling the air-conditioning system.

The air to be analysed can be air that is conditioned by at least one such heat exchanger of the air-conditioning system, in particular air from the interior of the related motor vehicle. The air to be analysed can also be outside air, meaning air from the ambient environment of the corresponding motor vehicle. It is also possible to supply a mixture of this to the sensor device and measure a corresponding characteristic of the mixture. For this purpose, the air or the air mixture is led through the analysis channel.

In accordance with a favourable embodiment, a valve set-up is provided, which serves to optionally guide the outside air, the air that has been air-conditioned by at least one heat exchanger or air from the interior of the motor vehicle through the analysis channel. The valve set-up, hereinafter referred to as a sensor-valve device, can additionally be designed in such a way that any mixture of outside air and/or air-conditioned air and/or air from the interior of the motor vehicle can be led through the analysis channel. Thereby, using the sensor device, the characteristic of the outside air, air-condition air or air from the interior of the motor vehicle or any mixture thereof can be measured.

The air-conditioning system air conditions the vehicle interior of the related motor vehicle by supplying an airflow into the interior. For this purpose, the air-conditioning system favourably comprises a channel system with the main channel, in which at least one such heat exchanger is arranged.

In order to apply air-conditioned air to the sensor temperature-control space or the generation device, the temperature-control channel can branch off from the main channel downstream from the at least one heat exchanger, in particular, upstream to the motor vehicle interior and supply air-conditioned air to the sensor temperature-control space. Thereby, the temperature-control channel can run from a branch-off point within the main channel to the sensor temperature-control space.

In addition or as an alternative, the temperature-control channel can be connected to the motor vehicle in such a way that the generation unit and the air from the interior of the motor vehicle can be applied as air-conditioned air.

As an alternative or in addition, the temperature-control channel can branch off from the analysis channel in order to supply air-conditioned air to the sensor temperature-control space and to apply air-conditioned air to the generation device, in particular, provided the air to be analysed is air-conditioned air. Thereby, it is particularly preferred if, within the temperature-control channel, such a sensor temperature-control filter device is arranged upstream to the sensor temperature-control space or the generation device to filter the air being applied to the generation device.

The generation device is principally designed in any way, provided that it generates electromagnetic waves to measure the characteristics of the air to be analysed during operation. In particular, it is conceivable that the generation device comprises a source to generate the electromagnetic waves and a controller to control the source.

Air-conditioned air to the generation device and supplying air-conditioned air to the sensor temperature-control space takes place in such a way that at least a part of the generation device is temperature controlled. That means that controlling the temperature of the generation device by means of the air-conditioned air can take place by applying air-conditioned air to at least parts of the generation device. Thereby, it is conceivable to apply air-conditioned air to the controller of the generation device, in particular, an electric controller, for the purpose of temperature control. It is also conceivable to control the temperature of the source of the generation device in such a way.

Embodiments are also conceivable where the generation device, in particular, the components of the generation device arranged within the sensor temperature-control space, is/are at least partially accommodated within a fluid-tight sheath. Thereby, a protection of the generation device's components accommodated in the sheath can be achieved, wherein these components are temperature controlled via the sheath. That means that a heat exchange with the air-conditioned air over the sheath takes place. For this purpose, the sheath is preferably designed from a material with enhanced heat exchange characteristics. In particular, the sheath is made of a metal, for example, aluminium or an aluminium alloy. Also, heat-conducting plastics or plastics with corresponding fillers or multilayer walls with an interior or exterior insulating layer are possible.

Using the sensor device, any characteristic of the air to be analysed can be measured. The sensor device can, in particular, be designed in such a way that, using it, particles in the air to be analysed can be measured. The measured characteristic can be the quantity and/or size and/or density of particles within the air to be analysed. It is advantageous if the sensor device is designed as a fine-dust particle sensor or comprises at least one such fine-dust particle sensor, with which the fine-dust particles are captured in the air to be analysed are measured.

In the case of preferred embodiments, the sensor temperature-control space, in which the generation device is at least partially arranged, is designed like a channel and extends along the sensor device. Thereby, also other components of the sensor device can be temperature-controlled. Thereby, in particular, a formation of condensation within the sensor device can be countered. Being particularly preferred, the sensor temperature-control space extends along a circumference of the sensor device, in particular, being enclosed around it within the sensor device. The supply of the air-conditioned air to the sensor temperature-control space and the discharge of air-conditioned air from the sensor temperature-control space can be implemented on the opposite sides of the sensor device, in particular of the sensor temperature-control space. The supply can discharge can also lie on the same side of the generation device. A partition wall can be arranged between the supply and the discharge. Applying air-conditioned air to the generation device can take place in the area of the supply or in the area of the discharge; the generation device, in particular, can be arranged in the respective area. Other flow-engineering interconnections can also be made. For example, the flow path of the air-conditioned air to the generation device can also be parallel to the sensor temperature-control space. In order to generate various flow paths, foamed inserts can be inserted, for example, made of particle foams as well as, for example, expanded polyethylene (EPE), expanded polypropylene (EPP), expanded polystyrene (EPS) or mixtures thereof (material blends).

Naturally, the sensor device can also be designed to measure two or a plurality of characteristics of the air to be analysed. For this purpose, the sensor device can comprise a plurality of sensors.

It is to be understood that, into addition to the air-conditioning system according to the invention, a related motor vehicle with such an air-conditioning system is part of the scope of this invention.

Other important features and advantages of the invention result from the subclaims, the drawings and the related figure description based on the drawings.

It is to be understood that the features explained in the aforementioned and in the following cannot only be used in the respectively indicated combination, but also in other combinations or alone, without departing from the scope of the present invention.

Preferred exemplary embodiments of the invention are represented in the drawings and will be described in more detail in the following description, wherein the same reference numbers will refer to the same or similar or functionally identical components.

DETAILED DESCRIPTION

Figure 1:
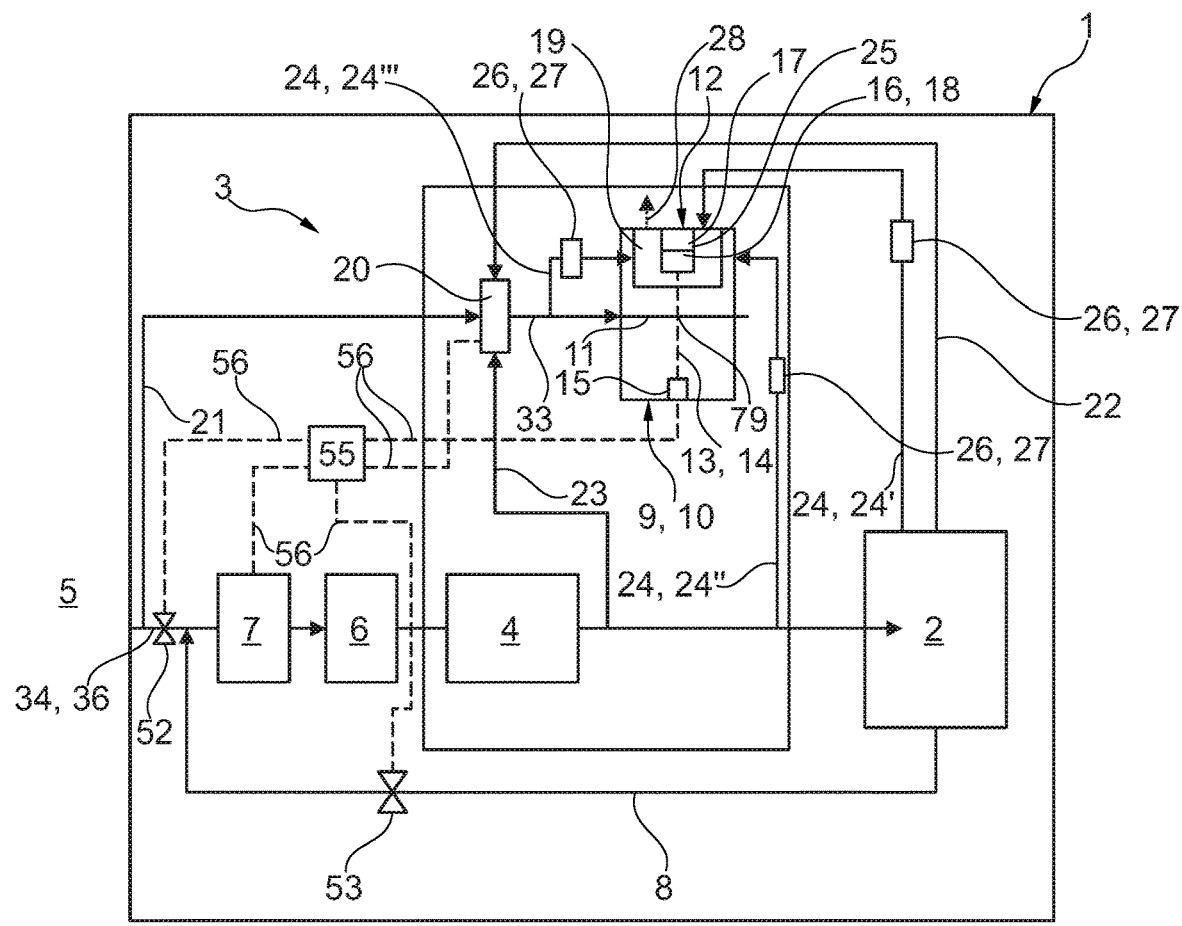
FIG. 1 shows a strongly simplified, schematic-like representation of a motor vehicle with an air-conditioning system and a sensor device.

A motor vehicle 1, as can be seen in FIG. 1, comprises an interior 2, hereinafter also referred to in the following as motor vehicle interior 2, for passengers (not shown), which is air-conditioned with the aid of an air-conditioning system 3. For this purpose, the air-conditioning system 3 comprises at least one heat exchanger 4, with which air is air conditioned, wherein at least on such heat exchanger 4 controls the temperature of the air/or changes the humidity in the air before it is supplied to the motor vehicle interior 2. During outside-air mode of the air-conditioning system 3, the outside air is led from an ambient environment 5 of the motor vehicle 1 through the heat exchanger 4 and to the vehicle interior 2. In order to let the outside air into the air-conditioning system 3, an outside-air channel 36 of a channel system 35 of the air-conditioning system 3 is provided, wherein, in the example shown, the outside-air channel 36 extends from the ambient environment 5 to the vehicle interior 3 and is also referred to hereinafter in the following as a main channel 34. Thereby, the heat exchanger 4 is arranged in the main conduit 34. Upstream from the heat exchanger 4, a bill the device 6, hereinafter also referred to as a system filter device 6, is arranged within the main channel 34 to filter the air being supplied to the motor vehicle interior 2. Upstream from the at least one heat exchanger 4, in the example shown, additionally upstream from the system filter device 6, a conveying device 7, hereinafter also referred to as a system conveying device 7, is arranged within the main channel 34 to convey the air being supplied to the interior 2. With the system conveying device 7, in outside-air mode, outside air from the ambient environment 5 is led through the system filter device 6 and the at least one heat exchanger 4 so that filtered as well as air-conditioned air enters into the vehicle interior 2. The air-conditioning system 3 can also be operated in circulating-air mode. For this purpose, a circulating-air channel 8 is provided, which runs from the vehicle interior 2 up to the main channel 34 upstream from the system conveying device 7 so that the air conveyed from the system conveying device 7 at least partially flows within the circuit, thereby being able to be recirculated. During operation of the air-conditioning system 3, it is desirable to know at least one characteristic of the air-conditioned air and/or of the air within the motor vehicle interior 2 and/or of the outside air in the ambient environment 5 of the motor vehicle 1 in order to control the air-conditioning system 3 according to the at least one characteristic. This characteristic can be the quality of the air or correlate with the quality. In order to determine such a characteristic, the air-conditioning system 3 comprises a sensor device 9. The sensor device 9 can be designed as a fine-dust particle sensor 10 or comprise such a fine-dust particle sensor 10. Due to the determination of the fine-dust load within the motor vehicle interior 2, in the ambient environment 5 as well as in the air-conditioned air, in particular, the air flowing through the main channel 6, in particular, it is possible to change between the outside-air mode and the circulating-air mode or a mixed mode. This control or adjustment of the air-conditioning system 3 preferably takes place in such a way that the interior 2 is provided with air of the highest level of quality possible. For this purpose, the air-conditioning system 3 comprises a control device 55, which, for example, with the aid of a communication connection 56, is connected to the sensor device 9 in such a way that it can query and/or the sensor device 9. Additionally, in the example shown, a circulating-air shutoff valve 53 is arranged in the circulating-air channel 8 and the outside-air shutoff valve 52 is provided within the outside-air channel 36. The respective shutoff valve 52, 53 blocks the respective channel 8, 36 in a closed position and releases in an open position, wherein positions of the respective shutoff valve are also possible between the closed position and the open position. The control device 55 is also connected to the respective shutoff valve 52, 53, for example, with the aid of such a communication connection 56 in such a way that it can query and/or control the respective shutoff valve. Thereby, the control device 55 in the air-conditioning system can be operated in outside-air mode, in circulating-air mode, and in the mixed mode. In the example shown, the control device 55 is also connected to the system conveying device 7 in such a way, for example, with the aid of such a communication connection 56, that it can query and/or control the system conveying device 7.

The sensor device 9 comprises an analysis channel 11 which air to be analysed can flow through and a generation device 12. Using the generation device 12, electromagnetic waves 13, in particular, light, are generated, which pass through the analysis channel 11 in an interaction section 79, in particular penetrating it. Thereby, it results in an interaction of the electromagnetic waves 13 with the air to be analysed, which makes the measurement of at least one characteristic of the air to be analysed possible. For this purpose, the sensor device 9 comprises a detector 15, which detects the electromagnetic waves 13 after passing through the analysis channel 11 or the interaction section 79 and the interaction with the air. Thereby, in the case of the sensor device 9 designed as a fine-dust particle sensor 10, the concentration of the find dust in the air to be analysed is measured and determined. Thereby, the generation device 12 comprises a source 16 to generate the electromagnetic waves 13 and a controller 17 to control the source 16. In the example shown, the source 16 is designed as a laser 18, which is controlled by means of the controller 17.

A space 19 separated from the analysis channel 11, hereinafter also referred to as a sensor temperature control 19, is provided within the sensor device 9, in which the generation device 12, in particular the source 16 and/or the controller 17 is/are arranged, wherein, in the example shown, both the source 16 as well as the controller 17 are arranged within the sensor temperature-control space 19.

A sensor supply channel 33 is provided to supply the air to be analysed to the analysis channel 11, wherein a sensor-valve device 20 is arranged upstream from the sensor supply channel 33. A sensor outside-air supply channel 21 leads unfiltered outside air originating upstream from the system filter device 7 from the ambient environment 5 of the motor vehicle 1 to the sensor-valve device 20. A sensor-inside-air-supply channel 22 guides air from the motor vehicle interior 2 to the sensor-valve device 20. A sensor system supply channel 23 branching off from the main channel 34 downstream from the at least one heat exchanger 4 and upstream to the motor vehicle interior 2, air that has been air-conditioned by the at least one heat exchanger 4 leads to the sensor-valve device 20. The air can also branch off between the at least one heat exchanger 4 and the system filter device 6 or before entering into the motor vehicle interior 2. The sensor-valve device 20 is designed in such a way that it optionally supplies the analysis channel 11 with outside air supplied to the sensor outside-air supply channel 21, with air supplied to the sensor-inside-air-supply channel 22 from the motor vehicle interior 2 or with air that has been air-conditioned by the heat exchanger 4 supplied to the sensor system supply channel 23 as air to be analysed. Thereby, with the same sensor device 9 at least one characteristic of outside air, air from the motor vehicle interior 2 or air that has been air-conditioned by at least one heat exchanger 4 can be determined upstream from the motor vehicle interior 2. In the example shown, using the same fine-dust particle sensor 10, the fine-dust load in the outside air, in the motor vehicle interior 2 or downstream from the at least one heat exchanger and upstream to the motor vehicle interior 2 can be measured and, in particular, be taken into account when switching between the outside-air mode and the circulating-air mode. Thereby, the sensor-valve device 20, for example, with the aid of such a communication connection 56, can be connected to the control device 55 in such a way that the control device 55 can query it and/or control it. For the temperature control of the generation device 12, in particular, of the source 16 and/or the controller 17, a temperature-control channel 24 is provided that is different from the main channel 6 or the at least one supply channel 21, 22, 23 leading to the analysis channel 11, which supplies air-conditioned air to the sensor temperature-control space 19 and thereby applies air-conditioned air to the generation device 12 for the purpose of temperature control of the generation device 12. Thereby, the air-conditioned air can originate from the motor vehicle interior 2 of the vehicle 1. For this purpose, such a temperature-control channel 24', hereinafter also referred to in the following as a first temperature-control channel 24', leads air from the vehicle interior 2 to the sensor temperature-control space 19. Thereby, it results in a heat exchange between the generation device 12 and the air-conditioned air supplied to the sensor temperature-control space 19 so that it results in a temperature control of the generation device 12. In the example shown, the source 16 and the controller 17 are accommodated within a fluid-tight sheath 25, which, in particular, can be made of metal or a metal alloy. The heat exchange with the source 16 and/or the controller 17 takes place via the sheath 25. In addition or as an alternative, air-conditioned air originating from the main channel 34 can be supplied to the sensor temperature-control space 19 downstream from the at least one heat exchanger 4 and upstream to the vehicle interior 2 and, thereby, it is applied to the generation device 12. For this purpose, such a temperature-control channel 24" is provided, which is hereinafter referred to in the following as a second temperature-control channel 24". The second temperature-control channel 24" branches off from the main channel 34 downstream from a heat exchanger 4 and upstream to the vehicle interior 2, in particular, from a mixing space (not shown) of the air-conditioning system 3 and flows into the sensor temperature-control space 19. It is also conceivable, downstream from the sensor-valve device 20, for example, to branch off air that is conditioned by the sensor supply channel 33 or by the analysis channel 11 and to supply it to the sensor temperature-control space 19, by means of such a temperature-control channel 24, hereinafter also referred to as a third temperature-control channel 24". In the example shown, the third temperature-control channel 24''' branches off from the sensor supply channel 33. The air-conditioned air supplied to the sensor temperature-control space 19 of the purpose of controlling the temperature of the generation device 12 flows through the sensor temperature-control space 19 and exits the sensor temperature-control space 19 via a sensor outlet 46 and a sensor temperature-control outlet channel 28.

It is preferred if the air serving to control the temperature of the generation device 12 and supplied to the sensor temperature-control space 19 is cleaned or filtered before applying it to the generation device 12, in particular, in order to avoid or reduce a dirtying of the source 16 or a wave outlet area (not shown) of the source 16. For this purpose, the system filter device 6 can be used. It is also conceivable, in particular, in the second temperature-control channel 24" and/or in the third temperature-control channel 24" to provide a filter device 26, also hereinafter referred to in the following as a sensor temperature-control filter device 26, that is separated from the system filter device 6 in order to filter the air before it enters into the sensor temperature-control space 19. The respective sensor temperature-control filter device 26 can comprise a fine-particle filter 27 or be designed as such. In the example shown in FIG. 1, in the respective temperature-control channel 24 upstream from the sensor temperature-control space 19, such a sensor temperature-control filter device 26 is provided, wherein this can be omitted in the second temperature-control channel 24".

The invention makes it possible to determine the characteristic to be measured of the air to be analysed with an increased level of precision, in particular the fine-dust content of the air to be analysed. In addition, due to the temperature control of the generation device 12, the service life of the generation device 12 and consequently the sensor device 9 is prolonged.

Figure 2:
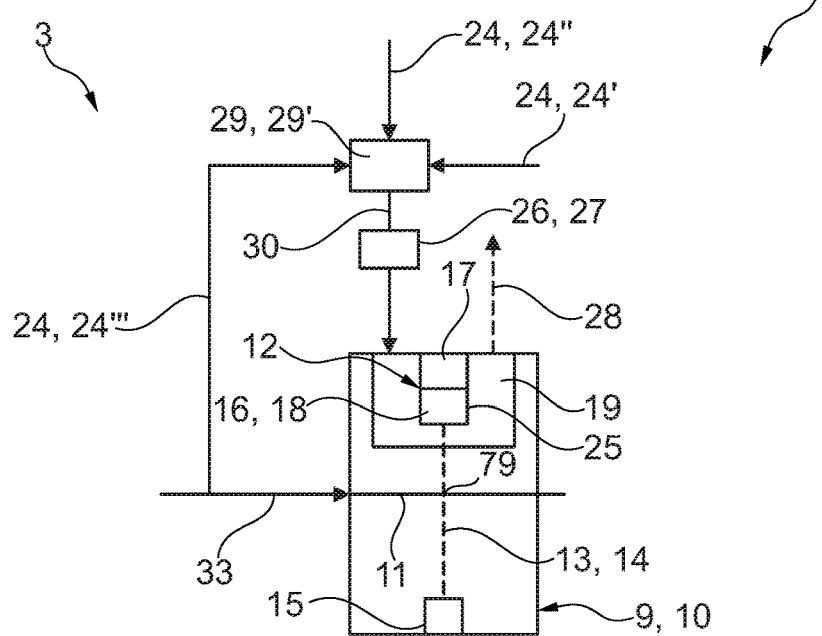
FIG. 2 shows a strongly simplified schematic-like representation of the air-conditioning system in the area of the sensor device in the case of another exemplary embodiment.

Another exemplary embodiment of the air-conditioning system 3 and of the motor vehicle 1 is shown in FIG. 2. This exemplary embodiment differs from the one shown in FIG. 1, in particular, due to the fact that the temperature-control channels 24 flow into a sensor temperature-control valve device 29, in particular, into a multi-port valve 29', the respective outlet of which is fluidically connected to the sensor temperature-control space 19 via a sensor-temperature-control supply channel 30. With the sensor-temperature-control valve device 29, it is possible to optionally supply air from the vehicle interior 2 via the first temperature-control channel 24, air from the main channel 34 via the second temperature-control channel 24" or air to be analysed via the third temperature-control channel 24''' to the sensor temperature-control space 19, thereby applying air-conditioned air to the generation device 12 for the purpose of controlling the temperature with air. Naturally, it is also possible to makes the air originating from at least two of the temperature-control channels 24 and supply them to the sensor temperature-control space 19. In the example shown, additionally, such a sensor temperature-control filter device 26, in particular such a fine-dust particle filter 27 is arranged within the sensor-temperature-control supply channel 30. Thereby, separate sensor temperature-control filter devices 26 within the respective temperature-control channels 24 can be respectively done without.

Figure 3:
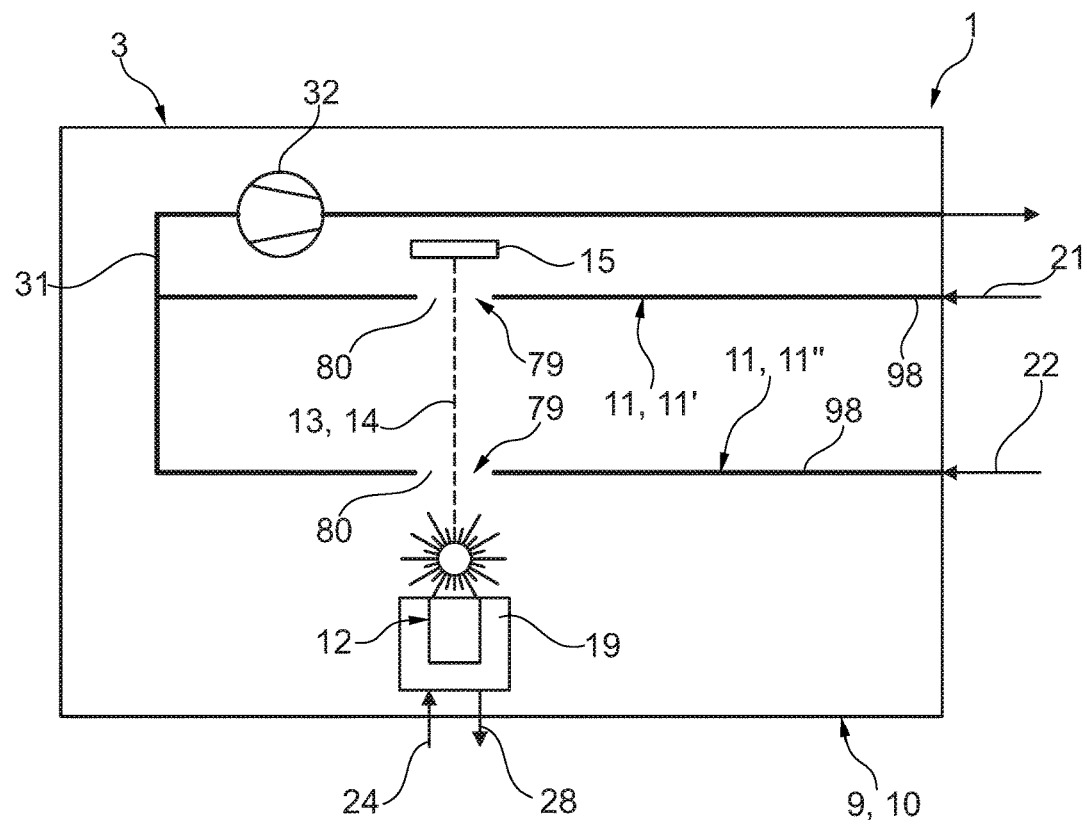
FIG. 3 shows a strongly simplified schematic-like representation of the sensor device in the case of another exemplary embodiment.

FIG. 3 shows another exemplary embodiment of the air-conditioning system 3 and of the motor vehicle 1, wherein the sensor device 9 can be viewed. This exemplary embodiment differs from the exemplary embodiments shown, in particular, due to the fact that the sensor device 9 comprises two such analysis channels 11. Thereby the outside air flows through one of the analysis channels 11 as air to be analysed. This analysis channel 11, hereinafter referred to in the following is the first analysis channel 11', is fluidically connected to the sensor outside-air supply channel 21. The other analysis channel 11, hereinafter referred to in the following as a second analysis channel 11", where air from the motor vehicle interior 2 flows through as air to be analysed. The second analysis channel 11" is fluidically connected to the sensor-inner-air-supply channel 22, The electromagnetic waves 13 generated by the generation device 12 thereby penetrate both analysis channels 11 in the interaction section 79 of the respective analysis channel 11, interact in the interaction section 79 with the air flowing through the analysis channel 11 and are detected there by the detector 15. Thereby, using the same sensor device 9, at least one characteristic of the outside air and one characteristic of the air within the motor vehicle interior 2 of the vehicle 1 can be measured. In particular, using the same sensor device 9, the fine-dust particle content within the outside air and the air within the motor vehicle interior 2 can be measured. Thereby, the respective interaction section 79 is formed by a break 80 of a channel sheath 98 limiting the flow of air within the related analysis channel 11. By means of this, and interaction of the electromagnetic waves 13 with the channel sheath 98 are avoided or at least reduced, thereby improving precision of the measured characteristic of the air.

In the example shown, both analysis channels 11 downstream from the respective related interaction section 79 flow into a sensor discharge channel 31, which leads the analogized air out of the sensor device 9. Thereby, in the example shown, within the sensor discharge channel 31 downstream from the respective interaction section 79, a sensor conveying device 32 is provided, which conveys the air to be respectively analysed through the analysis channels 11 and the sensor device 9.

Figure 4:
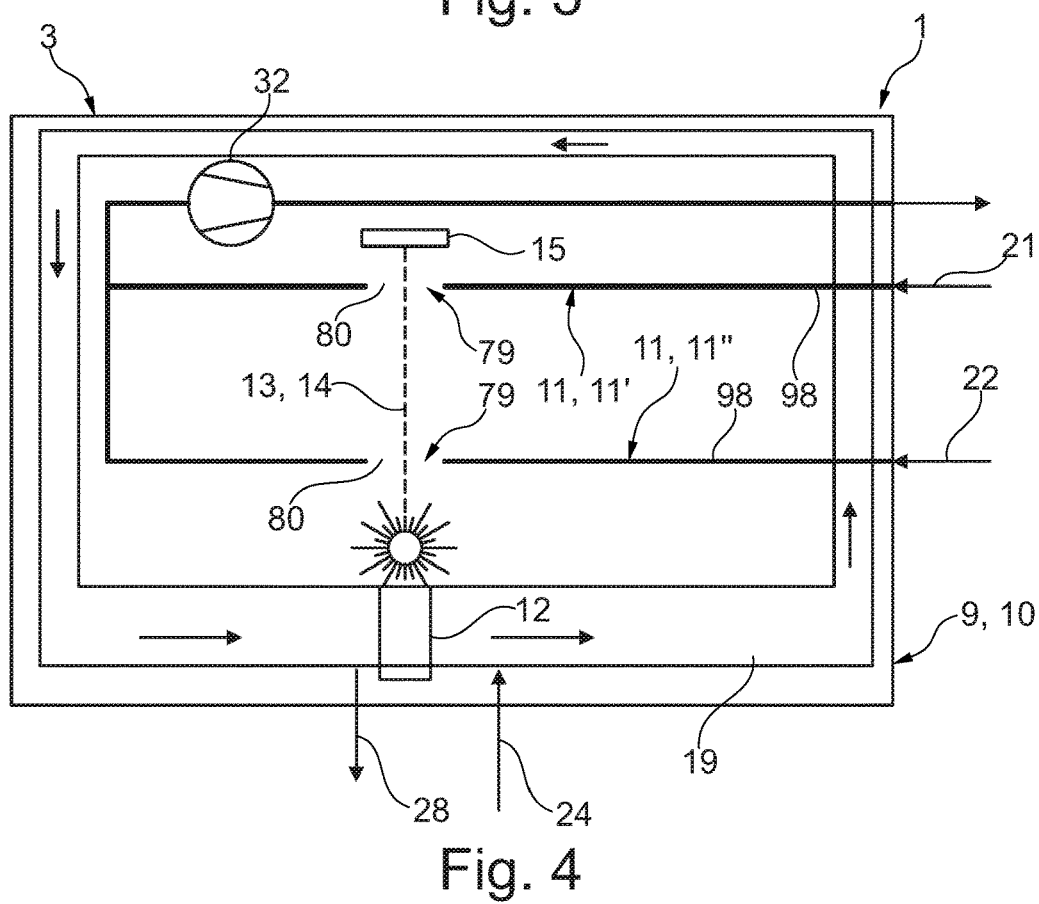
FIG. 4 shows a representation from FIG. 3 in the case of another exemplary embodiment.

In other exemplary embodiment of the air-conditioning system 3 as well as of the sensor device 9 is shown in FIG. 4. This exemplary embodiment differs from the exemplary embodiment shown in FIG. 3 in particular, due to the fact that the sensor temperature-control space 19, in which the generation device 12 is at least partially arranged, extends at least partially along the circumference of the sensor device 9, where I the sensor to control space 19 runs circumferentially along the circumference of the sensor device 9 in the case of the exemplary embodiment shown in FIG. 4. In the case of this embodiment, the air-conditioned air for the temperature control of the generation device 12 does not only serve to be applied to the generation device 12 for the purpose of controlling the temperature of the generation device 12, but also flows through the channel like sensor temperature-control space 19 along the circumference of the sensor device 9 and also control the temperature of further components of the sensor device 9. In the case of the exemplary embodiment shown, the sensor temperature-control channel 24 and the sensor temperature-control outlet channel 28 are fluidically connected to the sensor-temperature-control space 19 on the opposite sides of the generation device 12 so that the air-conditioned air flows around the sensor device 9 within the sensor-temperature-control space 19 and flows out via the sensor-temperature-control outlet channel 28. Thereby, the temperature of the generation device 12 as well as other components of the sensor device 9, in particular, at least one analysis channel 11 is controlled by means of the air-conditioned air. By means of this, in particular a formation condensation within the sensor device 9 is countered.

The invention claimed is:

1. An air-conditioning system of a motor vehicle comprising:
   a channel system configured to allow air to flow therethrough during operation, the channel system comprising a main channel;
   at least one heat exchanger positioned within the main channel and configured to air-condition air supplied to a motor vehicle interior of the motor vehicle;
   a sensor device configured to measure an air characteristic of air to be analysed comprising:
   an analysis channel including outside-air and inside-air supply channels arranged to form an interaction section configured for analysing the air;
   a generation device including an electromagnetic wave generator configured to generate electromagnetic waves penetrating the interaction section of the analysis channel;
   a sensor temperature-control space separated from the analysis channel, in which the generation device is at least partially arranged; and
   a temperature-control channel configured to apply air-conditioned air to the generation device to control a temperature of the generation device.

2. The air-conditioning system according to claim 1, further comprising a system filter device configured to filter the air being supplied to the motor vehicle interior and arranged within the main channel, wherein the temperature-control channel branches off from the main channel downstream of the system filter device.

3. The air-conditioning system according to claim 1, further comprising a second sensor device configured to filter the air applied to the generation device and arranged within the temperature-control channel.

4. The air-conditioning system according to claim 1, wherein the generation device is an optical generation device including a laser that is controlled by a controller arranged in the sensor temperature-control space.

5. The air-conditioning system according to claim 1, further comprising a sensor-valve device configured to optionally carry one of outside air, air-conditioned air, and air from the motor vehicle interior through the analysis channel.

6. The air-conditioning system according to claim 1, wherein the temperature-control channel branches from the main channel downstream of the at least one heat exchanger.

7. The air-conditioning system according to claim 1, wherein the temperature-control channel is connected to the motor vehicle interior to supply air to the generation device from the motor vehicle interior as air-conditioned air.

8. The air-conditioning system according to claim 3, wherein a portion of the air to be analysed flows through the temperature-control channel, and wherein the second sensor device is arranged upstream of the generation device in the temperature-control channel.

9. The air-conditioning system according to claim 1, wherein the generation device comprises:
   a source configured to generate the electromagnetic waves; and
   a controller to control the source.

10. The air-conditioning system according to claim 1, wherein the generation device is at least partially received within a fluid-tight sheath arranged in the sensor temperature-control space.

11. The air-conditioning system according to claim 1, wherein the sensor device comprises a fine-dust particle sensor.

12. The air-conditioning system according to claim 1, wherein the sensor temperature-control space extends across at least a part of the sensor device.

13. A vehicle with a vehicle interior, the vehicle comprising:
   a main air channel fluidly connected to the vehicle interior;
   a heat exchanger positioned within the main air channel and configured to air-condition air supplied to the vehicle interior;
   a sensor supply channel fluidly connected to the main air channel;
   a sensor device comprising:
   an analysis channel fluidly connected to the sensor supply channel and including outside-air and inside-air supply channels arranged to form an interaction section configured for analysing a flow of air;
   a sensor temperature-control space fluidly separated from the analysis channel;
   an electromagnetic wave generator positioned within the sensor temperature-control space and configured to direct electromagnetic waves through the interaction section of the analysis channel;
   a temperature-control channel configured to supply air-conditioned air to the sensor temperature-control space to reduce a temperature of the electromagnetic wave generator.

14. The vehicle according to claim 13, wherein the temperature-control channel branches from the main air channel downstream of the heat exchanger.

15. The vehicle according to claim 14, further comprising a system filter device positioned within the main air channel upstream from the heat exchanger and configured to filter the air being supplied to the heat exchanger.

16. The vehicle according to claim 13, further comprising a second sensor device positioned within the temperature-control channel and configured to filter the air applied to the generation device and arranged within the temperature-control channel.

17. The vehicle according to claim 13, further comprising:
the outside-air supply channel configured to pass unfiltered air therethrough;
a system supply channel fluidly connected with the main air channel and configured to pass air-conditioned air therethrough, the air-conditioned air supplied from the main air channel downstream of the heat exchanger;
the inside-air supply channel configured to pass air from the vehicle interior therethrough; and
a sensor-valve device fluidly connected with the outside-air supply channel, the system supply channel, and the inside-air supply channel, wherein the sensor-valve device is configured to selectively supply air to the sensor supply channel from one of the outside-air supply channel, the system supply channel, and the inside-air supply channel.

18. The vehicle according to claim 13, further comprising a sensor device including:
the electromagnetic wave generator; and
an electromagnetic wave detector configured to detect the electromagnetic waves directed through the analysis channel.

19. The vehicle according to claim 18, wherein the sensor device comprises a fine-dust particle sensor.

20. An air-conditioning system comprising:
a channel system configured to allow air to flow therethrough during operation, the channel system comprising a main channel;
a heat exchanger positioned within the main channel and configured to air-condition air supplied to a motor vehicle interior of a motor vehicle;
a sensor device configured to measure an air characteristic of air to be analysed and comprising:
an analysis channel including outside-air and inside-air supply channels arranged to form an interaction section for analysing the air;
a sensor temperature-control space fluidly separated from the analysis channel;
an optical generation device positioned within the sensor temperature-control space and configured to generate electromagnetic waves penetrating the interaction section of the analysis channel, wherein the optical generation device comprises a laser; and
a temperature-control channel configured to supply air-conditioned air from the heat exchanger to the optical generation device to control a temperature of the optical generation device.

* * * * *

UNITED STATES PATENT AND TRADEMARK OFFICE
CERTIFICATE OF CORRECTION

PATENT NO. : 10,843,526 B2
APPLICATION NO. : 16/120438
DATED : November 24, 2020
INVENTOR(S) : Knoeller et al.

Page 1 of 1

It is certified that error appears in the above-identified patent and that said Letters Patent is hereby corrected as shown below:

On the Title Page

Item (30) insert --Sep. 4, 2017 (DE).... 102017215465.9--

Signed and Sealed this
Twentieth Day of April, 2021

Drew Hirshfeld
*Performing the Functions and Duties of the
Under Secretary of Commerce for Intellectual Property and
Director of the United States Patent and Trademark Office*